United States Patent [19]

Latsko

[11] Patent Number: 5,117,957
[45] Date of Patent: Jun. 2, 1992

[54] COUPLING ASSEMBLY

[75] Inventor: James M. Latsko, North Royalton, Ohio

[73] Assignee: Eaton Corporation, Cleveland, Ohio

[21] Appl. No.: 703,367

[22] Filed: May 21, 1991

[51] Int. Cl.$^5$ .................... F16D 25/04; F16D 65/26
[52] U.S. Cl. ............................ 192/79; 192/85 AT; 192/88 B; 192/91 A; 188/170; 188/366
[58] Field of Search ............... 192/79, 85 AT, 88 R, 192/88 B, 91 A; 188/170, 365, 366, 367

[56] References Cited

U.S. PATENT DOCUMENTS

| 2,185,986 | 1/1940 | McCoy | 192/91 A |
| 2,897,924 | 8/1959 | Fawick | 188/367 |
| 3,334,946 | 8/1967 | Strobel | 188/170 X |
| 3,618,726 | 11/1971 | Sugahara | 192/79 |
| 4,552,257 | 11/1985 | Witt | 192/88 B X |
| 4,795,016 | 1/1989 | Schisler | 192/91 A X |

FOREIGN PATENT DOCUMENTS 0038370 10/1981 European Pat. Off. .......... 192/88 R

Primary Examiner—Richard Lorence
Attorney, Agent, or Firm—Tarolli, Sundheim & Covell

[57] ABSTRACT

A coupling assembly can be used as either a clutch or a brake to transmit force between a pair of elements. The coupling assembly includes an annular base which is connected with one of the elements and has radially inwardly and outwardly facing sides. A plurality of rim segments are disposed in an annular array adjacent to one of the radially facing sides of the base. An annular fluid extensible tube is disposed between the annular array of rim segments and the base. A plurality of friction shoes are disposed in an annular array adjacent to a second radially facing side of the base. The friction shoes are connected with rim segments by side plates. A plurality of springs are disposed between the friction shoes and the base. The springs firmly press the friction shoes against a friction surface connected with the second element to transmit force to retard relative rotation between the two elements. The tube is radially extensible under the influence of fluid pressure to move the rim segments away from the base and to move the friction shoes toward the base. As the friction shoes move toward the base, the springs are compressed between the friction shoes and the base.

14 Claims, 2 Drawing Sheets

COUPLING ASSEMBLY

BACKGROUND OF THE INVENTION

The present invention relates to a new and improved coupling assembly which may function as either a clutch or a brake between a pair of elements.

Known coupling assemblies which can be used as either a clutch or a brake are disclosed in U.S. Pat. Nos. 3,022,877; 3,092,231; 4,190,136; and 4,795,013. Each of these known coupling assemblies has an annular rim which is fixedly connected to one of two elements between which force is to be transmitted. An annular array of friction shoes is connected with the rim and is engageable with a cylindrical friction surface on the other element. An annular fluid extensible tube is disposed between the rim and the annular array of friction shoes.

When the tube in any one of the known coupling assemblies is radially extended under the influence of fluid pressure, the friction shoes are pressed against the friction surface to engage the coupling assembly When the fluid pressure in the tube is reduced, the tube retracts and the friction shoes move out of engagement with the friction surface to disengage the coupling assembly. Therefore, when the tube is retracted, the coupling assembly is disengaged and the two elements can be freely rotated relative to each other. It is only by expanding the tube, under the influence of fluid pressure, that coupling assembly is engaged to prevent relative rotation between the two elements.

Although these known coupling assemblies have been satisfactory in their mode of operation, there are certain operating environments in which it is desirable to have failsafe engagement of the coupling assembly. Thus, in the event of a failure to inflate the fluid extensible tube in these known coupling assemblies, the coupling assembly remains disengaged. The coupling assembly can be engaged only by inflating the tube. In certain operating environments, it is desirable to have the coupling assembly engaged if there is a failure to supply fluid under pressure to the fluid extensible tube.

SUMMARY OF THE INVENTION

The present invention provides a new and improved coupling assembly having springs which urge the coupling assembly to an engaged condition preventing relative movement between a pair of elements The coupling assembly includes an annular base which is connected with a first one of the two elements. A plurality of friction shoes are disposed in an annular array which is coaxial with the annular base. The springs are disposed between the base and the friction shoes to press the friction shoes against a friction surface connected with the second one of the two elements.

The coupling assembly is operated from the engaged condition to a disengaged condition by an annular fluid extensible tube. The tube is coaxial with the annular base and is radially extensible under the influence of fluid pressure. As the tube is radially extended, the springs are compressed and the friction shoes move away from the friction surface connected with the second element.

Accordingly, it is an object of this invention to provide a new and improved coupling assembly for transmitting force between first and second elements and wherein springs urge the coupling assembly toward an engaged condition, a fluid extensible tube being provided to operate the coupling assembly to a disengaged condition.

BRIEF DESCRIPTION OF THE DRAWINGS

The foregoing and other objects and features of the present invention will become more apparent upon a consideration of the following description taken in connection with the accompanying drawings, wherein.

DESCRIPTION OF ONE SPECIFIC PREFERRED EMBODIMENT OF THE INVENTION

General Description

Figure 1:
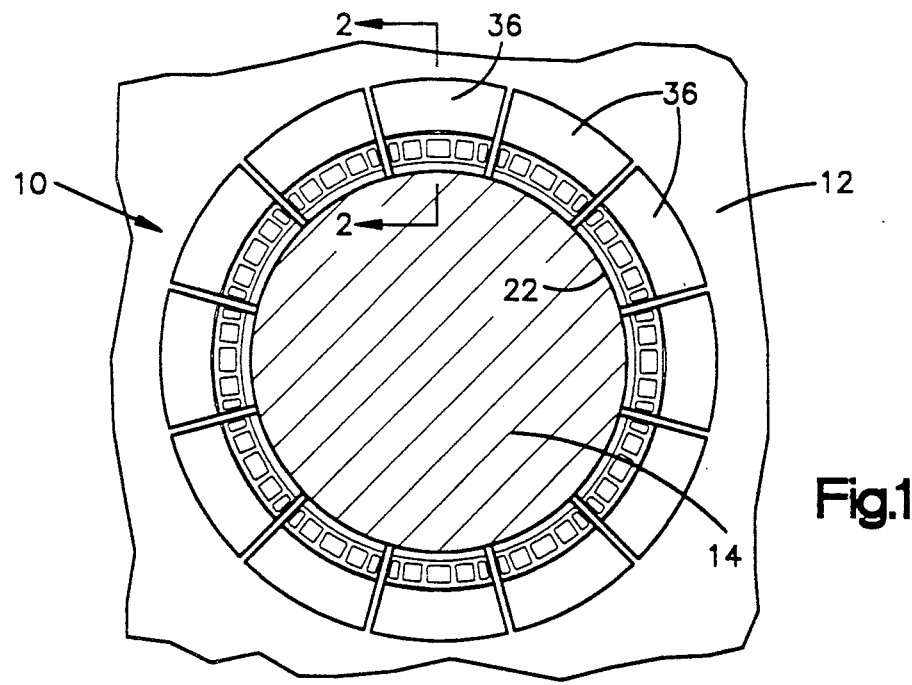
FIG. 1 is a plan view of a coupling assembly which is constructed in accordance with the present invention to transmit force between a pair of elements.

A coupling assembly 10 (FIG. 1) is operable between an engaged condition and a disengaged condition. When the coupling assembly 10 is in the engaged condition shown in FIGS. 1 and 2, the coupling assembly is effective to transmit force between the first element 12 and a second element 14. Although the coupling assembly 10 can function as either a clutch or a brake, in the illustrated embodiment of the invention, the coupling assembly functions as a brake. Thus, the coupling assembly 10 is connected with a stationary element 12 and is operable to retard rotation of a movable element 14 when the coupling assembly 10 is in the engaged condition. When the coupling assembly 10 is in a disengaged condition (FIG. 3), the coupling assembly is ineffective to retard relative rotation between the stationary element 12 and movable element 14.

The coupling assembly 10 includes a rigid annular base member 20 (FIGS. 2 and 3) which is fixedly secured to the stationary element 12. A plurality of friction shoes 22 are disposed in an annular array which is coaxial with the base member 20. The friction shoes 22 are engageable with a cylindrical friction surface 24 on the movable element 14. The stationary base member 20 holds the friction shoes 22 against rotation with the movable element 14 when the coupling assembly 10 is in the engaged condition of FIG. 2.

Figure 2:
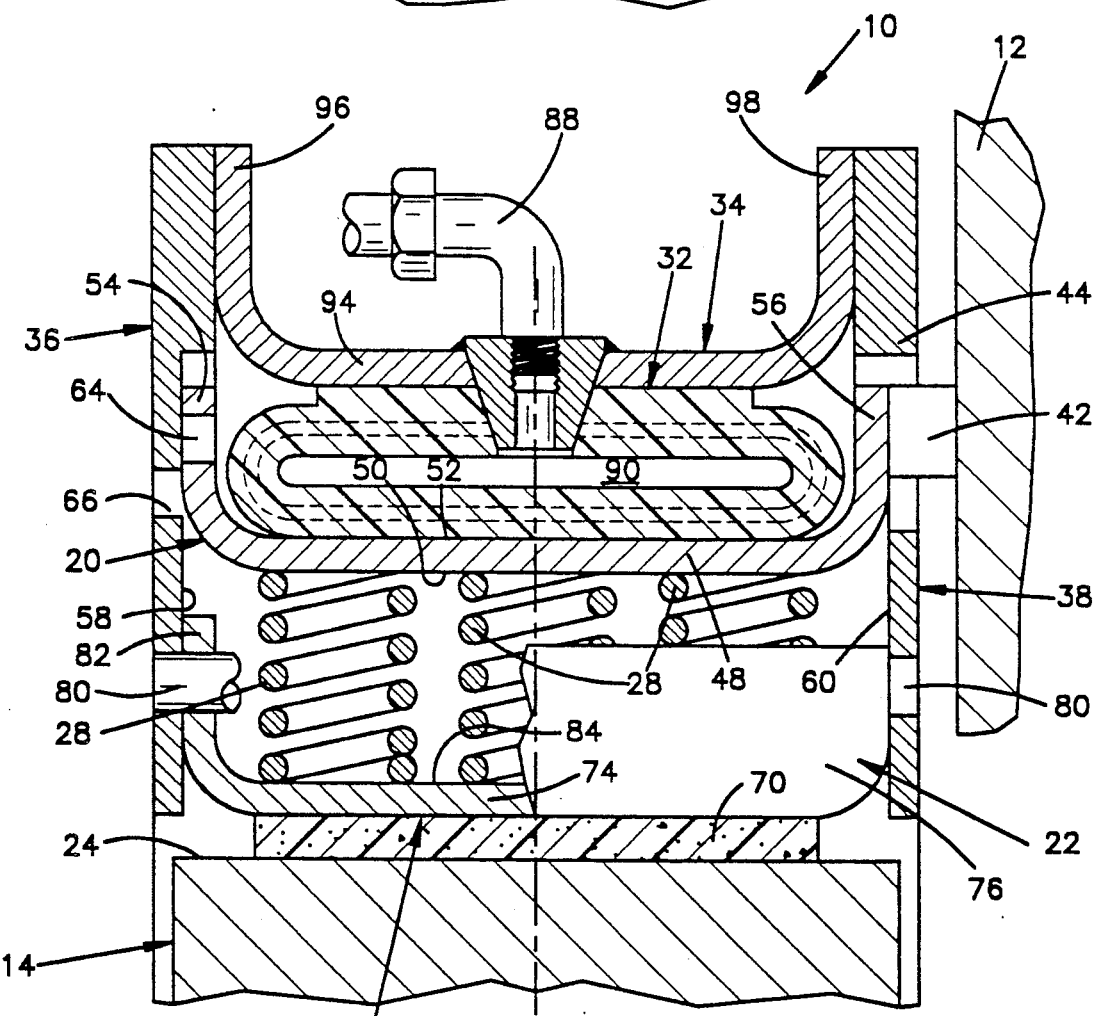
FIG. 2 is a sectional view, taken generally along the line 2—2 of FIG. 1, illustrating the relationship between a fluid extensible tube, a plurality of springs, and a friction shoe in the coupling assembly, the coupling assembly being shown in an engaged condition in which the springs press the friction shoe against a friction surface connected with an element to be held against rotation.

In accordance with a feature of the present invention, the coupling assembly 10 is continuously urged toward the engaged condition of FIG. 2 by a plurality of springs 28. To operate the coupling assembly 10 from the engaged condition of FIG. 2 to the disengaged condition of FIG. 3, the friction shoes 22 must be retracted toward the base member 20 and the springs 28 compressed. This results in the coupling assembly 10 having a failsafe mode of operation in which the coupling assembly is engaged unless energy is supplied to operate the coupling assembly to the disengaged condition of FIG. 3.

Figure 3:
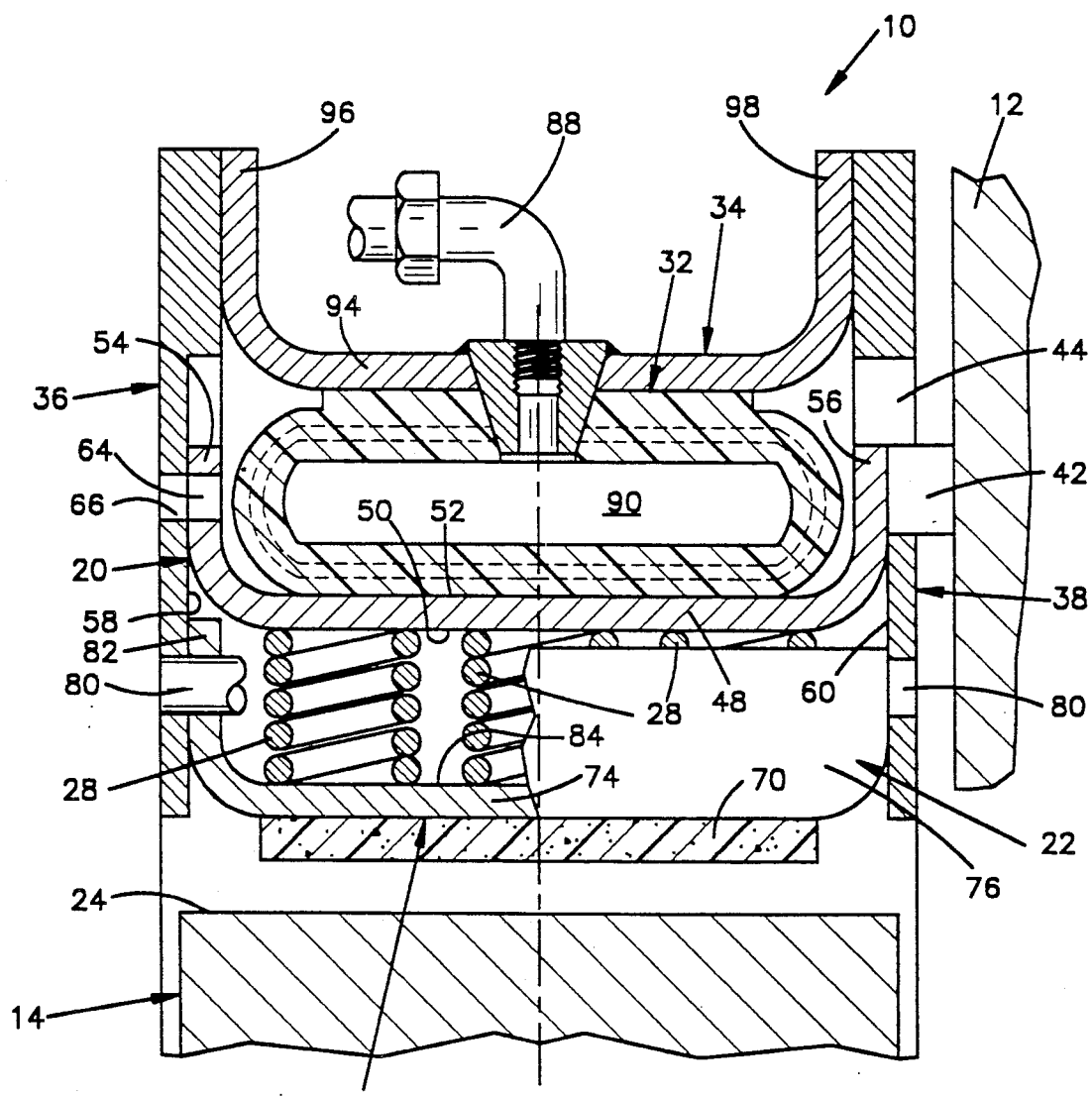
FIG. 3 is a sectional view, generally similar to FIG. 2, illustrating the relationship between the tube, springs and friction shoe when the coupling assembly is in a disengaged condition.

To operate the coupling assembly to the disengaged condition of FIG. 3, an annular fluid extensible tube 32 is disposed in a coaxial relationship with the base member 20 and annular array of friction shoes 22. The tube 32 is radially extendible under the influence of fluid pressure to move the friction shoes 22 from the engaged position of FIG. 2 to the disengaged position of FIG. 3. When the friction shoes 22 are in the engaged position, the friction shoes are pressed against the cylindrical friction surface 24 on the movable element 14. When the friction shoes 22 are in the disengaged position, the friction shoes are spaced from the cylindrical friction surface 24 on the movable element 14.

A plurality of rigid arcuate rim segments 34 are disposed in an annular array which is coaxial with the base member 20. The tube 32 is disposed between the base member 20 and the rim segments 34. The rim segments 34 are connected with the friction shoes 22 by a plurality of side plates 36 and 38 which are disposed in an annular array on axially opposite sides of the coupling 10.

Upon radial extension of the tube 32 under the influence of fluid pressure, the rim segments 34 move away from the base member 20. This results in the side plates 36 and 38 pulling the friction shoes 22 toward the bas member 20. As the friction shoes 22 are pulled toward the base member 20, the springs 28 are compressed and the coupling assembly 10 is operated from the engaged condition of FIG. 2 to the disengaged condition of FIG. 3.

When the fluid pressure transmitted to the tube 32 is reduced, the springs 28 move the friction shoes 22 away from the base member 20. As this occurs, the friction shoes 22 move into engagement with the friction surface 24 on the outside of the movable element 14. Once this occurs, the coupling assembly 10 is again in the engaged condition of FIG. 2.

As the coupling assembly 10 operates to the engaged condition, the rim segments 34 are pulled toward the base member 20 to move the tube 32 from the extended condition of FIG. 3 to the collapsed condition of FIG. 2. Thus, in the absence of air pressure to the tube 32, the coupling assembly 10 is operated to or remains in the engaged condition holding the movable element 14 against rotation relative to the stationary element 12.

Although the coupling assembly 10 has been shown in FIGS. 1-3 engaging a cylindrical friction surface 24 on the outside of the movable element 14, the coupling assembly 10 could be constructed to engage a cylindrical friction surface on the inside of the a movable element. If this was done, the movable element would have a generally hollow configuration similar to the configuration of a drum. The friction shoes 22 would be disposed in an annular array around the outside of the coupling assembly and the rim segments 34 would be disposed in an annular array around the inside of the coupling assembly. The springs 28 would still be disposed between the friction shoes 22 and the base member 20. The tube 32 would still be disposed between the rim segments 34 and base member 20.

Coupling Components

The stationary base member 20 is formed of metal and has an annular configuration. The annular base member 20 is fixedly connected with the stationary element 12 by a plurality of mounting lugs 42. Each of the mounting lugs 42 extends through a radially extending slot 44 formed in the side plate 38. This enables the side plate 38 to move radially relative to the base member 20 during operation of the coupling assembly 10 between the engaged and disengaged conditions of FIGS. 2 and 3. Although a mounting lug 42 has been shown as projecting from only the right (as viewed in FIG. 2) of the base member 20, a similar mounting lug could be connected with a portion of the stationary member 12 disposed on the axially opposite side of the base member if desired.

The base member 20 has a rigid annular web section 48 which is engaged by the springs 28 and tube 32. Thus, a cylindrical and radially inwardly facing side surface 50 on the web section 48 of the base member 20 is engaged by the springs 28. Similarly, a cylindrical and radially outwardly facing side surface 52 on the web section 48 of the base member 20 is engaged by the tube 32.

The base member 20 has a pair of radially extending annular flanges 54 and 56 which are integrally formed with the web section 48. The annular flanges 54 and 56 slidably engage flat inner side surfaces 58 and 60 on the metal side plates 36 and 38. The stationary flanges 54 and 56 on the base member 20 guide radial movement of the rim segments 34 relative to the base member as the coupling assembly 10 is operated between the engaged and disengaged conditions.

It is contemplated that it may be desirable to lock the coupling assembly 10 in the disengaged condition (FIG. 3) against the influence of the springs 28. To enable this to be done, an opening 64 is provided in the flange 54. An opening 66 in the side plate 36 moves into alignment with the opening 64 as the coupling assembly is operated to the disengaged condition of FIG. 3. When a pin is inserted into the openings 64 and 66, the coupling assembly 10 is locked in the disengaged condition.

Each of the friction shoes 22 has an arcuate friction pad 70 which engages the friction surface 24 on the second or movable element 14 when the coupling assembly 10 is in the engaged condition of FIG. 2. The friction pad 70 is mounted on a rigid arcuate backing plate 72. The metal backing plate 72 has a rigid main section 74 to which the friction pad 70 is connected and a pair of radially outwardly turned end sections 76, only one of which is shown in FIGS. 2 and 3.

Each friction shoe 22 is supported from a pair of side plates 36 and 38 by a pair of cross shafts 80 (only one of which is shown in FIGS. 2 and 3). The cross shafts 80 extend through radially outwardly extending flanges 82 formed as one piece with the main section 74 of the backing plate 72. Elastomeric material may be provided around the shafts 80 to dampen vibration.

Although it is preferred to use a pair of shafts 80 and flanges 82 to connect the friction shoes 22 with the side plates 36 and 38, any desired method of connecting the friction shoes with the side plate could be used. It should also be understood that the friction shoes 22 could have any one of many known constructions. In one specific embodiment of the invention, the friction shoes 22 have the same construction as friction shoes used on a VC-type pressure applied drum brake which is commercially available from Airflex Division of Eaton Corporation which has a place of business at Cleveland, Ohio.

The friction shoes 22 are disposed in an annular array with a slight gap or space between the ends of the friction shoes. In one specific embodiment of the invention, each of the friction shoes occupied a segment of the annular array having an arcuate extent of slightly less than 30°. There were twelve friction shoes provided in the annular array of friction shoes.

The annular array of friction shoes 22 is radially expanded as the coupling assembly 10 is operated from the engaged condition of FIG. 2 to the disengaged condition o FIG. 3. The annular array of friction shoes 22 is radially contracted as the coupling assembly 10 is operated from the disengaged condition of FIG. 3 to the engaged condition of FIG. 2. As the coupling assembly 10 is operated between the engaged and disengaged conditions, each of the friction shoes 22 is moved along a radial path relative to the annular base member 20, to expand or contract the annular array of friction shoes.

The springs 28 extend between a rigid metal backing plate 72 of a friction shoe 22 and the web section 48 of the base member 20. In the illustrated embodiment of the invention, the springs 28 apply force against the radially inwardly facing side surface 50 on the base member 20 and against a radially outwardly facing side surface 84 of a backing plate 72. Since the base member 20 is stationary, when the coupling assembly 10 is operated from the engaged condition of FIG. 2 to the disengaged condition of FIG. 3, the friction shoe backing plate 72 presses against the springs 28 to compress them against the base member 50. If the coupling assembly is constructed so as to have the friction shoes 22 disposed in an annular array around a radially outer portion of the coupling assembly, the springs 28 would be compressed as the friction shoes 22 move radially inwardly and the coupling assembly is operated to the disengaged condition The springs 28 provide for failsafe operation of the coupling assembly 10. If for some unforeseen reason the supply of air or other fluid under pressure to effect extension of the tube 32 is interrupted, the springs 28 would hold the coupling assembly 10 in the engaged condition. Therefore, the movable element 14 would be held against rotation relative to the stationary element 12.

Although the springs 28 could have many different known constructions, in the illustrated embodiment of the invention, the springs 28 are metal coil springs. The coil springs 28 have central axes which extend radially relative to the base member 20. Thus, the central axes of the coil springs 28 extend perpendicular to the radially inwardly facing side surface 50 of the web section 48 of the base member 20. In the illustrated embodiment of the invention, three coil springs 28 are provided at a central portion of each of the friction shoes 22. However, it is contemplated that a different number of coil springs 28 could be provided at a different location relative to each of the friction shoes 22. For example, two coil springs 28 could be provided at each end of a friction shoe 22.

The annular tube 32 is formed, in a known manner, of a vulcanized elastomeric material having a cord reinforcement. The tube may be bonded to the rim segments 34 and the base member 20. The tube 32 is radially extensible under the influence of fluid pressure conducted through a suitable fitting 88 to an annular chamber 90 in the tube.

The tube 32 extends around the outside of the annular base member 20. The base member 20 may be formed of several rigid metal segments which are positioned in the circular central opening of the annular tube and fixedly interconnected to form the unitary annular base member 20. The tube 32 may be bonded to the radially outwardly facing side 52 of the base member 20. Other known ways of connecting the tube with the base member could be utilized if desired. In fact, it is contemplated that it may be preferred not to bond the tube 32 to the rim segment 34 in order to allow for expansion and contraction of the annular array of rim segments.

The annular tube 32 is surrounded by an annular array of arcuate rim segments 34. The rigid metal rim segments 34 may be bonded to the radially outwardly facing side of the tube 32. Each of the rim segments 34 includes a cylindrical web section 94 which forms a portion of a circle which is coaxial with the web section 48 of the base member 20. Each rim segment 34 has a pair of radially extending flanges 96 and 98 which are fixedly connected with the side plates 36 and 38. Each of the side plates 36 and 38 is fixedly connected with one of the axial sides of a backing plate 72 of a friction shoe 22. Thus, the flanges 96 and 98 on the rim segment 34 are connected with the friction shoe backing plate 72 by the side plates 36 and 38.

Each of the rim segments 34 has an arcuate extent which corresponds to the arcuate extent of one of the friction shoes 22. Thus, there are twelve rim segments 34 which are connected with the twelve friction shoes 22 by twelve pairs of side plates 36 and 38. Like the friction shoes 22, each of the rim segments 34 has an arcuate extent which is slightly less than 30°. Therefore, there is space between the ends of the rim segments 34.

The annular array of ri segments can be radially extended and retracted by extension and retraction of the tube 32. Although it is preferred to connect each of the rim segments 34 with only one friction shoe 22 by a pair of side plates 36 and 38, it is contemplated that a plurality of friction shoes 22 could be connected with single rim segments 34 if desired.

Operation

When the coupling assembly 10 is in the engaged condition of FIG. 2, the chamber 90 in the tube 32 is exhausted to the atmosphere through the fitting 88. At this time, the springs 28 press the friction shoes 22 against the friction surface 24 on the outside of the second movable element 14. Therefore, the coupling assembly 10 holds the movable element 14 against rotation relative to the stationary element 12.

When the coupling assembly 10 is engaged, force is transmitted between the movable element 14 and stationary element 12 by the coupling assembly. Thus, the base member 20 of the coupling assembly 10 is held against rotation by the stationary element 12. Force is transmitted from the friction shoes 22 to the side plates 36 and 38 by the friction shoe mounting bars 80. The side plates 38 transmit the force to the lugs 42 which are connected with the stationary element 12. In addition, force may be transmitted to the base member 20 through the rim segments 34 and tube 32.

When the movable element 14 is to be rotated relative to the stationary element 12, the coupling 10 is operated from the engaged condition of FIG. 2 to the disengaged condition of FIG. 3. When the coupling assembly 10 is to be operated to the disengaged condition of FIG. 3, fluid under pressure (air) is conducted through the fitting 88 to the annular chamber 90 in the tube 32. The fluid pressure in the tube 32 causes the tube to be inflated from the collapsed condition of FIG. 2 to the expanded condition of FIG. 3. As this occurs, the tube 32 is extended radially outwardly.

As the tube 32 is extended radially outwardly, the rim segments 34 are moved radially outwardly. This movement of the rim segments 34 is transmitted through the side plate 36 and 38 to the friction shoes 22. This pulls the friction shoes 22 radially outwardly toward the annular base member 20. Thus, as the tube 32 is extended under the influence of fluid pressure in the chamber 90, the friction shoes 22 are moved toward the base member 20 and the rim segments 34 are moved away from the base member. This results in the diameter of the annular array of friction shoes 22 being increased as the diameter of the annular array of rim segments 34 is increased.

Moving the friction shoes 22 toward the annular bas member 20 compresses the springs 28 between the friction shoes and base member. At this time, the friction pads 70 on the friction shoes 22 are spaced from the friction surface 24 on the movable element 14. This enables the movable element 14 to be freely rotated relative to the stationary element 12.

The coupling assembly 10 remains in the disengaged condition of FIG. 3 as long as fluid pressure is maintained in the chamber 90 in the tube 32. However, upon a reduction in the fluid pressure in the chamber 90 of the tube 32, the radially inward force exerted by the springs 28 against the friction shoes 22 is effective to move the friction shoes radially inwardly toward the cylindrical surface 24 on the movable element 14. As the friction shoes 22 move inwardly with a resulting reduction in the diameter of the annular array of friction shoes, the rim segments 34 are moved radially inwardly with a resulting reduction in the diameter of the annular array of rim segments. As the fluid pressure in the tube chamber 90 continues to be reduced, the springs 28 press the friction shoes 22 into firm engagement with the friction surface 24 on the movable element 14.

When this occurs, force is transmitted from the movable element 14 through the friction shoes 22 to the side plates 36 and 38. The force may be transmitted to the rim segments 34 and through the tube 32 to the base member 20. In addition, force is transmitted directly from the side plate 38 to the mounting lug 42 on the base member 20. The force may also be transmitted from the base member 20 to the stationary element 12 through the mounting lug 42. Therefore, engagement of the friction shoes 22 with the friction surface 24 on the outside of the movable element 14 is effective to hold the movable element against rotation relative to the stationary element 12.

Conclusion

In view of the foregoing description it is apparent that the present invention provides a new and improved coupling assembly 10 having springs 28 which urge the coupling assembly to an engaged condition preventing relative movement between a pair of elements 12 and 14. The coupling assembly includes an annular base which is connected with the element 12. A plurality of friction shoes 22 are disposed in an annular array which is coaxial with the annular base 20. The springs 28 are disposed between the base 20 and the friction shoes 22 to press the friction shoes against a friction surface 24 connected with the second element 14 of the two elements 12 and 14.

The coupling assembly 10 is operated from the engaged condition (FIG. 2) by an annular fluid extensible tube 32. The tube 32 is coaxial with the annular base 20 and is radially extensible under the influence of fluid pressure. As the tube 32 is radially extended, the springs 28 are compressed and the friction shoes 22 move away from the friction surface 24.

Having described one specific preferred embodiment of the invention, the following is claimed:

1. A coupling assembly for transmitting force between first and second elements, said coupling assembly comprising an annular base having a radially inwardly facing side and a radially outwardly facing side, a plurality of rim segments disposed in an annular array which is coaxial with said annular base and is adjacent to a first one of the radially facing sides of said annular base, said rim segments being movable relative to each other and said annular base to increase and decrease a diameter of the annular array of rim segments, an annular fluid extensible tube formed as one-piece and disposed between said annular array of rim segments and the first one of the radially facing sides of said annular base, said annular fluid extensible tube defining an annular chamber which is disposed in a coaxial relationship with said annular base, a plurality of friction shoes disposed in an annular array which is coaxial with said annular array of rim segments and said annular fluid extensible tube, said annular array of friction shoes being disposed adjacent to a second one of the radially facing sides of said annular base, said annular base being disposed between and in a coaxial relationship with said annular array of rim segments and said annular array of friction shoes, said friction shoes being connected with said rim segments for movement therewith relative to said annular base, said friction shoes being movable relative to each other to increase a diameter of said annular array of friction shoes as a diameter of said annular array of rim segments increases and to decrease a diameter of said annular array of friction shoes as a diameter of said annular array of rim segments decreases, and a plurality of springs disposed between said friction shoes and the second one of the radially facing sides of said annular base, said plurality of springs being disposed in an annular array which is disposed between said annular array of friction shoes and said annular base and is coaxial with said annular array of rim segments and said annular fluid extensible tube, said annular fluid extensible tube being radially extensible under the influence of fluid pressure in said annular chamber to move said rim segments away from the first one of the radially facing sides of said annular base and to move said friction shoes toward the second one of the radially facing sides of said annular base against the influence of said springs.

2. A coupling assembly as set forth in claim 1 wherein said springs are coil springs having a central axes which extend in a radial direction relative to said annular base and said annular fluid extensible tube.

3. A coupling assembly as set forth in claim 1 wherein said springs are compressed between said annular base and said friction shoes as said friction shoes move toward the second one of the radially facing sides of said annular base.

4. A coupling assembly as set forth in claim 1 further including first connector means disposed adjacent a first axial end of said annular fluid extensible tube and extending between said friction shoes and said rim segments to interconnect said friction shoes and rim segments, and second connector means disposed adjacent a second axial end of said annular fluid extensible tube and extending between said friction shoes and said rim segments to interconnect said friction shoes and rim segments, said annular fluid extensible tube being disposed between said first and second connector means.

5. A coupling assembly as set forth in claim 1 further including fluid passage means extending through said annular array of rim segments and connected in fluid communication with the annular chamber in said annular fluid extensible tube.

6. A coupling assembly as set forth in claim 1 wherein said annular array of springs is compressible between said annular array of friction shoes and said second one of the radially facing sides of said annular base upon radial extension of said tube under the influence of fluid pressure.

7. A coupling assembly for transmitting force between first and second elements, said coupling assembly comprising an annular base having a radially inwardly facing side and a radially outwardly facing side, a plurality of rim segments disposed in an annular array adjacent to a first one of the radially facing sides of said base, an annular fluid extensible tube disposed between said annular array of rim segments and the first one of the radially facing sides of said base, said tube defining an annular chamber which is disposed in a coaxial relationship with said annular base and said annular array of rim segments, a plurality of friction shoes disposed in an annular array adjacent to a second one of the radially facing sides of said base, said friction shoes being connected with said rim segments for movement therewith, and a plurality of springs disposed between said friction shoes and the second one of the radially facing sides of said base, said tube being radially extensible under the influence of fluid pressure in the annular chamber in said tube to move said rim segments away from the first one of the radially facing sides of said base and to move said friction shoes toward the second one of the radially facing sides of said base against the influence of said springs, said springs being compressed between said friction shoes and said base under the influence of force applied against said springs by said friction shoes and the second one of the radially facing sides of said base upon radial extension of said tube under the influence of fluid pressure in the annular chamber in said tube.

8. A coupling assembly as set forth in claim 7 wherein said rim segments are movable relative to each other to increase and decrease a diameter of the annular array of rim segments, said friction shoes being movable relative to each other to increase a diameter of the annular array of friction shoes as the diameter of the annular array of rim segments increases and to decrease the diameter of the annular array of friction shoes as the diameter of the annular array of rim segments decreases.

9. A coupling assembly as set forth in claim 7 wherein said springs are coil springs having central axes which extend in a radial direction relative to said base.

10. A coupling assembly as set forth in claim 7 further including first connector means disposed adjacent to a first axial end portion of said annular fluid extensible tube and extending radially between a first axial end portion of said annular array of friction shoes and a first axial end portion of said annular array of rim segments, second connector means disposed adjacent to a second axial end portion of said annular fluid extensible tube and extending radially between a second axial end portion of said annular array of friction shoes and a second axial end portion of said annular array of rim segments, said annular fluid extensible tube being disposed between said first and second connector means, said first and second connector means moving with said friction shoes and rim segments relative to said base upon extension of said tube under the influence of fluid pressure in the annular chamber in said tube.

11. A coupling assembly as set forth in claim 7 further including fluid passage means extending through said annular array of rim segments and connected in fluid communication with the annular chamber in said tube.

12. A coupling assembly for transmitting force between first and second elements, said coupling assembly comprising an annular base having a radially inwardly facing side and a radially outwardly facing side, a plurality of rim segments disposed in an annular array adjacent to a first one of the radially facing sides of said base, an annular fluid extensible tube disposed between said annular array of rim segments and the first one of the radially facing sides of said base, a plurality of friction shoes disposed in an annular array adjacent to a second one of the radially facing sides of said base, first connector means disposed adjacent to a first axial end portion of said annular fluid extensible tube and extending between a first axial end portion of said annular array of friction shoes and a first axial end portion of said annular array of rim segments, second connector means disposed adjacent to a second axial end portion of said annular fluid extensible tube and extending between a second axial end portion of said annular array of friction shoes and a second axial end portion of said annular array of rim segments, said annular fluid extensible tube being disposed between said first and second connector means, and a plurality of springs disposed between said friction shoes and the second one of the radially facing sides of said base and between said first and second connector means, said tube being radially extensible under the influence of fluid pressure in said tube to move said rim segments away from the first one of the radially facing sides of said base, said friction shoes being movable toward the second one of the radially facing sides of said base under the influence of force transmitted from said rim segments to said friction shoes by said first and second connector means upon radial extension of said tube to compress said springs between said friction shoes and said base.

13. A coupling assembly as set forth in claim 12 wherein said rim segments are movable relative to each other to increase and decrease a diameter of the annular array of rim segments, said friction shoes being movable relative to each other to increase a diameter of the annular array of friction shoes as the diameter of the annular array of rim segments increases and to decrease the diameter of the annular array of friction shoes as the diameter of the annular array of rim segments decreases.

14. A coupling assembly as set forth in claim 12 wherein said springs are coil springs having central axes which extend in a radial direction relative to said base.

* * * * *